United States Patent [19]

Bjornlie et al.

[11] Patent Number: 4,755,037
[45] Date of Patent: Jul. 5, 1988

[54] FIBER OPTIC COUPLER

[75] Inventors: Harvey C. Bjornlie, Pacific Palisades; Timothy E. Clark, Santa Ana, both of Calif.

[73] Assignee: McDonnell Douglas Corporation, Long Beach, Calif.

[21] Appl. No.: 37,462

[22] Filed: Apr. 13, 1987

[51] Int. Cl.$^4$ ............................................. G02B 6/26
[52] U.S. Cl. .................................. 350/96.15; 350/320
[58] Field of Search .................. 350/96.15, 96.16, 320

[56] References Cited

U.S. PATENT DOCUMENTS

| | | | |
|---|---|---|---|
| 4,291,940 | 9/1981 | Kawasaki et al. | 350/96.15 |
| 4,392,712 | 7/1983 | Ozeki | 350/96.16 |
| 4,402,570 | 9/1983 | Chang | 350/96.30 |
| 4,449,781 | 5/1984 | Lightstone et al. | 350/96.16 X |
| 4,632,513 | 12/1986 | Stowe et al. | 350/96.15 X |

FOREIGN PATENT DOCUMENTS 2942318  4/1981  Fed. Rep. of Germany ... 350/96.15

*Primary Examiner*—John Lee
*Assistant Examiner*—Phan Heartney
*Attorney, Agent, or Firm*—Benjamin Hudson, Jr.; George W. Finch; John P. Scholl

[57] ABSTRACT

A fiber optic coupler is provided having first and second optical fibers fused together along a predetermined length having fused tapered ends for the input and output of optical energy and a constant diameter section therebetween to facilitate coupling of optical energy between the first and second optical fibers. The constant diameter section provides a higher efficient coupling action and a stronger, more rugged coupler.

1 Claim, 1 Drawing Sheet

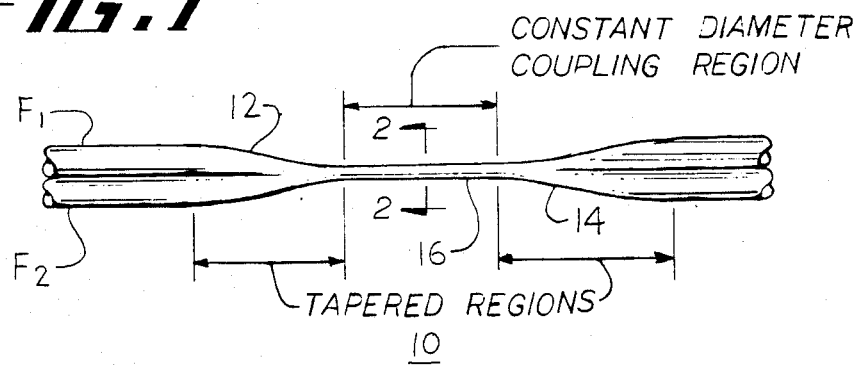
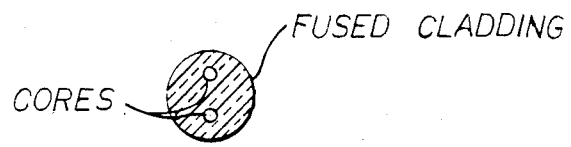

FIBER OPTIC COUPLER

BACKGROUND OF THE INVENTION

This invention relates generally to single-mode fiber couplers, and more particularly to single-mode fiber couplers wherein the coupling ratio is determined by the taper length and the diameter of the coupler structure in the fused coupling region.

A fused fiber optic coupler consists of two or more adjacent optical fibers, that are joined by heating to form a common region. Optical coupling is the phenomenon which transfers transmitted light from one fiber to another fiber in this common region. The amount of light transferred is determined by the length of the coupling region and the distance separating the cores of two fibers in this region. Light transfer is increased by increasing the coupling length and reducing the core separation distance. Low loss access biconical tapered couplers are described in U.S. Pat. No. 4,291,940 entitled "LOW-LOSS ACCESS COUPLER FOR MULTI-MODE OPTICAL FIBER DISTRIBUTION APPARATUS" wherein biconical taper sections of the fibers are fused together to provide optical coupling between the fibers. Also in U.S. Pat. No. 4,392,712 entitled "LIGHT DISTRIBUTOR" an optical coupler is provided with a plurality of optical fibers each having a tapered portion, and the tapered portion of the fibers are thermally fused together to form a light mixing section where the cores of the fibers are packed together in a single cladding.

These biconical type couplers are usually formed by fusing and stretching the fibers simultaneously.

SUMMARY OF THE INVENTION

It is an object of this invention to provide a fiber optic coupler having a long cylindrical shaped coupling region positioned between the two tapered sections. This cylindrical shaped coupling region provides advantages over the prior art biconical type couplers because the coupling effect is much less affected by small changes in the length and diameter of the cylindrical coupling region. This means that for any given level of performance, a cylindrical coupler can be made with less precise equipment than a biconical coupler.

Also, reduced sensitivity to dimensional tolerances permits improved control of the coupling effect which means a potential increase of production yield. In addition, it allows the manufacture of couplers with a more exact amount of coupling. Therefore, it is an object of this invention to provide a coupler having a higher efficient coupling action.

It is also an object of this invention to provide a more rugged fiber optic coupler. The smallest diameter of the cylindrical coupling region is larger than the smallest diameter of a biconical coupler. This feature makes it stronger and more rugged.

BRIEF DESCRIPTION OF THE DRAWINGS

FIG. 1 illustrates a fiber optic coupler having a cylindrical coupling region in accordance with the principles of this invention; and FIG. 2 illustrates a cross section of FIG. 1.

DESCRIPTION OF THE PREFERRED EMBODIMENT

Referring to FIGS. 1 and 2, there is shown a fiber optic cylindrical coupler 10 that is generally comprised of two fibers F1 and F2 that are fused or melted together along a portion of their length having tapered regions 12 and 14 and a constant diameter coupling region 16. The coupler is formed in two distinct sequences. First, after stripping away the protective jacket, two fibers which have not had their size or geometry altered by heating, etching, or other means, are fused or melted together along the bared portion of their length. Then the fused region is heated again and stretched differentially to form the cylindrical coupling region and the adjacent tapers. During the fusion step the molten fiber cladding flows allowing the cores to move closer together as shown in FIG. 2. This means that less stretching is needed to achieve the desired core separation distance. The result is a larger finished diameter of the coupling region.

The couplers are designed to have a cylindrical coupling region of a predetermined diameter, but with varying lengths. The taper length at each end of the coupling region is also predetermined, almost always 5 mm. The sole dimensional parameter which is determined during the process is the length of the constant diameter section, which is varied to produce the desired coupling ratio. This is necessary because any piece of fiber may vary in quality and geometry along its length, and the core separation distance may vary in quality and geometry along its length, and the core separation distance may vary during the fusing process. The couplers' average total package length varies from 27 mm for 830 nm single mode fiber 20 mm to 35 mm for 830 nm single mode fiber to 35 mm for 800 nm multi-mode fiber. Its minimal diameter in the coupling region varies from 40 to 60 microns and has an average that is near 50 microns, thus making a stronger part. The majority of couplers made to this configuration have exhibited coupling ratios of 50 percent +5 percent and excess insertion losses of less than 0.1 dB.

Cylindrical couplers have been manufactured for use at wavelengths of 1300 nm, 830 nm, 633 nm with single-mode fibers, and 800 nm with multi-mode fibers. The couplers produced for use at 1300 nm were made with Spectran fibers having an initial diameter of 125 microns. The constant diameter coupling region averaged 54 microns in diameter with an average length of 7 mm. Couplers were also produced with Corning 1300 nm dispersion shifted fiber having an initial diameter of 125 microns. The average dimensions of the coupling region were 60 microns in diameter by 18 mm in length.

For a wavelength of 830 nm, fibers manufactured by Lightwave Technologies, Fujikura and Corning were used, with an initial diameter ranging between 75 to 80 microns. The average coupling region diameter was 50 microns, and its average length was 8 mm.

In the 633 nm wavelength specification, Corning fiber was used with an initial diameter of 80 microns. The constant diameter section averaged 35 microns with an average length of 1.5 mm.

For multi-mode couplers, Raychem fiber was used in the 800 nm wavelength specification. The initial diameter of the fiber was 250 microns. The average coupling region diameter was 220 microns with an average length of 15 mm.

Although there has been illustrated and described specific detail and structure of operation, it is clearly understood that the same were merely for purposes of illustration and that changes and modifications may be readily made therein by those skilled in the art without departing from the spirit and the scope of this invention.

What we claim is:

1. A method of producing a fiber optic coupler, comprising:

(a) stripping away the protective jacket and cleaning at least two fiber optic waveguides;

(b) placing the stripped and cleaned sections of the waveguides longitudinally side by side in intimate contact under slight tension;

(c) heating the fiber optic waveguides along the longitudinally placed sections to cause the outer cladding materials to fuse and melt together; and (d) reheating and stretching the fused waveguides differentially forming a reduced cylindrical constant diameter coupling region at the midsection of the fused waveguides.

* * * * *